US012683884B2

(12) United States Patent
    Khalil et al.

(10) Patent No.:    US 12,683,884 B2
(45) Date of Patent:        Jul. 14, 2026

(54) SYSTEM AND METHOD FOR SIMULATION AND TESTING OF MULTIPLE VIRTUAL ECUS

(71) Applicant: Siemens Industry Software Inc., Plano, TX (US)

(72) Inventors: Keroles Khalil, Cairo (EG); Magdy Aly Aly Elmorsy, Portland, OR (US)

(73) Assignee: Siemens Industry Software Inc., Plano, TX (US)

( * ) Notice:     Subject to any disclaimer, the term of this patent is extended or adjusted under 35 U.S.C. 154(b) by 598 days.

(21) Appl. No.:     18/041,009

(22) PCT Filed:     Aug. 25, 2020

(86) PCT No.:     PCT/US2020/047794
    § 371 (c)(1),
    (2) Date:     Feb. 8, 2023

(87) PCT Pub. No.: WO2022/046035
    PCT Pub. Date: Mar. 3, 2022

(65)         Prior Publication Data
    US 2023/0261961 A1        Aug. 17, 2023

(51) Int. Cl.
    *H04L 43/20*        (2022.01)
    *G06F 11/26*        (2006.01)
        (Continued)

(52) U.S. Cl.
    CPC ............ *H04L 43/20* (2022.05); *G06F 11/261* (2013.01); *H04L 12/40019* (2013.01);
        (Continued)

(58) Field of Classification Search
    CPC ............... H04L 43/20; H04L 12/40019; H04L 12/40032; H04L 69/22; H04L 2012/40273;
        (Continued)

(56)         References Cited

U.S. PATENT DOCUMENTS 7,313,731 B2 *  12/2007  Smith ..................... G06F 30/33
                                                    714/37
8,195,774 B2 *  6/2012  Lambeth ................. H04L 49/70
                                                    709/220
        (Continued)

FOREIGN PATENT DOCUMENTS

AU        2009249516 A1 * 11/2009  ............. H04L 49/70
CA           2887427 A1 * 11/2009  ......... G06F 9/45558
        (Continued)

OTHER PUBLICATIONS

PCT International Search Report and Written Opinion of International Searching Authority mailed May 21, 2021 corresponding to PCT International Application No. PCT/US2020/047794 filed Aug. 25, 2020.
        (Continued)

*Primary Examiner* — Michael A Keller

(57)         ABSTRACT

Systems and methods for simulation and testing of multiple virtual electronic control units (VECUs). A method (1000) includes executing, by one or more computer systems (101), a first VECU (502). The method includes executing a virtual bus (510), the virtual bus (510) associated with the first VECU (502). The method includes executing at least one second VECU. The method includes simulating a multiple-VECU system by managing communications, using the virtual bus (510), between the first VECU (502) and the at least one second VECU.

13 Claims, 12 Drawing Sheets

(51) Int. Cl.
  *H04L 12/40*    (2006.01)
  *H04L 69/22*    (2022.01)
(52) U.S. Cl.
  CPC ........ *H04L 12/40032* (2013.01); *H04L 69/22*
    (2013.01); *H04L 2012/40273* (2013.01)
(58) Field of Classification Search
  CPC ... H04L 41/40; H04L 41/145; H04L 43/0817;
      H04L 43/50; G06F 11/261; G06F
        11/3457; G06F 30/3308
  See application file for complete search history.

(56)          References Cited

U.S. PATENT DOCUMENTS

| | | | | |
|---|---|---|---|---|
| 8,451,731 B1 * | 5/2013 | Lee | ..................... | H04L 43/0817 |
| | | | | 709/224 |
| 8,478,902 B1 * | 7/2013 | Holland | .............. | G06F 9/45558 |
| | | | | 709/250 |
| 8,504,864 B2 * | 8/2013 | Menon | ................. | H04L 12/403 |
| | | | | 713/400 |
| 8,547,972 B2 * | 10/2013 | Mahdavi | ................. | G06F 9/455 |
| | | | | 370/389 |
| 8,826,068 B2 * | 9/2014 | Somendra | ........... | G06F 11/3688 |
| | | | | 714/15 |
| 8,924,619 B2 * | 12/2014 | Cohen | .................. | G06F 3/0658 |
| | | | | 710/33 |
| 8,930,690 B2 * | 1/2015 | Zuo | ......................... | H04L 47/20 |
| | | | | 713/162 |
| 9,203,781 B2 * | 12/2015 | Cheng | ..................... | G06F 9/455 |
| 9,531,643 B2 * | 12/2016 | Cheng | ..................... | H04L 49/70 |
| 9,569,232 B1 * | 2/2017 | Brandwine | ......... | H04L 47/2441 |
| 9,641,406 B1 * | 5/2017 | Allen | ....................... | G06F 8/65 |
| 9,743,282 B2 * | 8/2017 | Paczkowski | ........... | H04L 63/20 |
| 9,769,052 B2 * | 9/2017 | Kuznetsov | ........... | H04L 69/329 |
| 9,921,949 B2 * | 3/2018 | Xia | ......................... | G06F 30/33 |
| 10,055,245 B1 * | 8/2018 | Gupta | ................ | G06F 9/45558 |
| 10,133,591 B2 * | 11/2018 | Brandwine | ......... | H04L 63/1458 |
| 10,142,290 B1 * | 11/2018 | Brandwine | ......... | H04L 63/0263 |
| 10,355,930 B2 * | 7/2019 | Wanser | .............. | H04L 12/4633 |
| 10,360,015 B2 * | 7/2019 | Allen | ....................... | G06F 8/65 |
| 10,362,612 B2 * | 7/2019 | Valicherla | ........... | H04L 12/4641 |
| 10,587,471 B1 * | 3/2020 | Bramhill | .............. | G06F 9/5077 |
| 10,666,560 B2 * | 5/2020 | Cardona | .............. | H04L 45/586 |
| 10,826,787 B2 * | 11/2020 | Soundararajan | ........ | H04L 43/20 |
| 10,931,742 B2 * | 2/2021 | Colle | ................. | H04L 12/4641 |
| 10,958,576 B2 * | 3/2021 | Joshi | .................. | H04L 49/901 |
| 11,032,162 B2 * | 6/2021 | Jain | .................... | H04L 41/5041 |
| 11,190,463 B2 * | 11/2021 | Lambeth | ................ | H04L 49/70 |
| 11,314,907 B2 * | 4/2022 | Phatak | ................... | G06F 30/20 |
| 11,397,606 B2 * | 7/2022 | Lagerholm | ......... | H04L 43/0817 |
| 11,546,224 B2 * | 1/2023 | Vecera | ................. | H04L 41/145 |
| 11,757,797 B2 * | 9/2023 | Lambeth | ................ | H04L 49/70 |
| | | | | 718/1 |
| 11,894,983 B2 * | 2/2024 | Malleni | ................... | H04L 43/20 |
| 11,909,620 B2 * | 2/2024 | Gu | .......................... | H04L 43/50 |
| 12,463,890 B2 * | 11/2025 | Gu | .......................... | H04L 43/50 |
| 2003/0028606 A1 * | 2/2003 | Koopmans | ........... | H04L 69/329 |
| | | | | 709/206 |
| 2004/0030776 A1 * | 2/2004 | Cantrell | ............... | H04L 69/161 |
| | | | | 709/225 |
| 2004/0039774 A1 * | 2/2004 | Xu | ........................ | H04L 69/162 |
| | | | | 709/227 |
| 2005/0097404 A1 * | 5/2005 | Smith | ..................... | G06F 30/33 |
| | | | | 714/47.1 |
| 2005/0108501 A1 * | 5/2005 | Smith | ..................... | G06F 30/33 |
| | | | | 712/1 |
| 2006/0155708 A1 * | 7/2006 | Brown | ................... | H04L 41/22 |
| 2009/0103968 A1 * | 4/2009 | Ballot | ..................... | B43K 7/10 |
| | | | | 401/137 |
| 2009/0292858 A1 * | 11/2009 | Lambeth | ............. | G06F 9/45558 |
| | | | | 711/6 |
| 2009/0327471 A1 * | 12/2009 | Astete | ................. | G06F 9/45558 |
| | | | | 718/1 |

| | | | | |
|---|---|---|---|---|
| 2010/0313200 A1 * | 12/2010 | Rozee | ................. | G06F 9/45537 |
| | | | | 718/1 |
| 2012/0029898 A1 * | 2/2012 | Carroll | .................... | G06F 21/53 |
| | | | | 703/20 |
| 2012/0140861 A1 * | 6/2012 | Menon | ...................... | B60T 7/18 |
| | | | | 375/356 |
| 2012/0151476 A1 * | 6/2012 | Vincent | ................. | G06F 9/4856 |
| | | | | 718/1 |
| 2012/0198441 A1 * | 8/2012 | Mahdavi | ................. | G06F 9/455 |
| | | | | 718/1 |
| 2013/0132774 A1 * | 5/2013 | Somendra | ............ | H04L 41/046 |
| | | | | 714/E11.178 |
| 2013/0344877 A1 * | 12/2013 | Ma | ........................ | H04W 16/04 |
| | | | | 455/446 |
| 2014/0058871 A1 * | 2/2014 | Marr | ...................... | H04L 43/16 |
| | | | | 718/1 |
| 2014/0281057 A1 * | 9/2014 | Cohen | .................. | G06F 3/0656 |
| | | | | 710/52 |
| 2014/0337497 A1 * | 11/2014 | Wanser | ................. | H04L 41/40 |
| | | | | 709/223 |
| 2014/0351394 A1 * | 11/2014 | Elisha | ................ | G06F 11/3495 |
| | | | | 709/222 |
| 2014/0351412 A1 * | 11/2014 | Elisha | ................ | G06F 11/3452 |
| | | | | 709/224 |
| 2015/0046572 A1 * | 2/2015 | Cheng | ................. | H04L 12/4641 |
| | | | | 709/220 |
| 2015/0288750 A1 * | 10/2015 | Nagargadde | ........ | H04L 41/0866 |
| | | | | 709/203 |
| 2016/0028656 A1 * | 1/2016 | Cheng | ................. | H04L 41/0806 |
| | | | | 709/220 |
| 2016/0149751 A1 * | 5/2016 | Pani | ....................... | H04L 45/22 |
| | | | | 370/221 |
| 2016/0188451 A1 * | 6/2016 | Xia | .......................... | G06F 8/70 |
| | | | | 717/135 |
| 2016/0212620 A1 * | 7/2016 | Paczkowski | .............. | H04L 9/32 |
| 2016/0254982 A1 * | 9/2016 | Kuznetsov | .......... | G06F 9/45558 |
| | | | | 709/224 |
| 2016/0306966 A1 * | 10/2016 | Srivastava | ................ | H04L 9/30 |
| 2017/0013507 A1 * | 1/2017 | Lee | .......................... | H04W 4/80 |
| 2017/0262300 A1 * | 9/2017 | Brandwine | ............. | H04L 43/20 |
| 2017/0272337 A1 * | 9/2017 | Allen | ...................... | G06F 8/65 |
| 2017/0295084 A1 * | 10/2017 | Ramanath | .......... | H04L 43/0876 |
| 2017/0331884 A1 * | 11/2017 | Colle | .................. | H04L 67/1001 |
| 2019/0044823 A1 * | 2/2019 | Soundararajan | ........ | H04L 12/66 |
| 2019/0349294 A1 * | 11/2019 | Cardona | ................. | H04L 45/64 |
| 2020/0106676 A1 * | 4/2020 | Duda | ........... | H04L 41/0895 |
| 2020/0267080 A1 * | 8/2020 | Joshi | ...................... | H04L 67/12 |
| 2020/0328989 A1 * | 10/2020 | Lambeth | ............. | G06F 9/45558 |
| 2020/0356399 A1 * | 11/2020 | Kiffmeier | ............ | G06F 9/5044 |
| 2020/0358660 A1 * | 11/2020 | Vecera | ................. | H04L 43/067 |
| 2021/0021486 A1 * | 1/2021 | Jain | .................... | H04L 41/5041 |
| 2021/0049027 A1 * | 2/2021 | Lagerholm | ......... | G06F 11/3065 |
| 2021/0288885 A1 * | 9/2021 | Malleni | ................... | H04L 41/40 |
| 2021/0312107 A1 * | 10/2021 | Koutsomanis | ........ | G06F 9/5077 |
| 2022/0086106 A1 * | 3/2022 | Lambeth | ............. | G06F 9/45558 |
| 2022/0407818 A1 * | 12/2022 | Gnaneswaran | ........... | G06F 9/46 |
| 2023/0127800 A1 * | 4/2023 | Gu | .......................... | H04L 43/50 |
| | | | | 709/224 |
| 2023/0421511 A1 * | 12/2023 | Lambeth | ............. | G06F 9/45558 |
| 2024/0154894 A1 * | 5/2024 | Gu | .......................... | H04L 43/50 |
| 2024/0348518 A1 * | 10/2024 | Shi | ........................ | H04L 41/145 |
| 2025/0007749 A1 * | 1/2025 | Yang | ............... | H04L 12/40006 |
| 2025/0097110 A1 * | 3/2025 | Nallamala | ............. | H04L 41/145 |
| 2025/0208982 A1 * | 6/2025 | Fulljames | .......... | G06F 11/3684 |
| 2025/0274345 A1 * | 8/2025 | Rozenbaum | ........ | H04L 41/0895 |

FOREIGN PATENT DOCUMENTS

| | | | | | |
|---|---|---|---|---|---|
| CA | | 2887427 C | * | 2/2016 | ......... G06F 9/45558 |
| CA | | 2814207 C | * | 5/2017 | .............. H04L 7/70 |
| CN | | 102571251 A | | 7/2012 | |
| CN | | 103543999 A | | 1/2014 | |
| CN | | 104104534 A | * | 10/2014 | ........... H04L 41/40 |
| CN | | 105453487 A | * | 3/2016 | ........ H04L 12/4641 |
| CN | | 107453971 A | * | 12/2017 | ............ H04L 47/10 |
| CN | | 107784152 A | | 3/2018 | |
| CN | | 107820604 A | | 3/2018 | |

(56) References Cited

FOREIGN PATENT DOCUMENTS

| | | | | | |
|---|---|---|---|---|---|
| CN | 105453487 B | * | 7/2019 | ......... | H04L 12/4641 |
| CN | 110521183 A | | 11/2019 | | |
| CN | 110663070 A | | 1/2020 | | |
| CN | 107005428 B | * | 8/2020 | ......... | H04L 67/1001 |
| CN | 111565139 A | | 8/2020 | | |
| CN | 112039722 A | * | 12/2020 | ............ | H04L 43/50 |
| CN | 107209711 B | * | 1/2021 | ............ | G06F 11/261 |
| CN | 109416639 B | * | 10/2023 | ............ | H04L 43/50 |
| CN | 118132425 A | * | 6/2024 | ............ | G06F 9/5077 |
| CN | 118796749 A | * | 10/2024 | ......... | G06F 13/4295 |
| DE | 102014101321 A1 | | 8/2015 | | |
| DE | 102015101388 A1 | * | 8/2016 | ............ | G06F 11/261 |
| DE | 102016222091 A1 | * | 5/2017 | ............ | B60W 20/50 |
| DE | 102017220783 A1 | * | 5/2018 | ............ | H04L 12/40 |
| DE | 102018100879 A1 | * | 5/2019 | ............ | H04L 67/12 |
| DE | 102018111851 A1 | * | 11/2019 | .............. | G06F 1/04 |
| EP | 3026855 A2 | * | 6/2016 | ......... | G06F 9/45558 |
| EP | 3026855 B1 | * | 10/2017 | ............ | H04L 49/70 |
| EP | 3000040 B1 | * | 7/2018 | ............ | H04L 43/20 |
| EP | 3407542 A1 | * | 11/2018 | ............ | H04W 56/00 |
| EP | 3222011 B1 | * | 5/2020 | ............ | H04L 45/22 |
| EP | 3031175 B1 | * | 10/2020 | ......... | H04L 12/4641 |
| EP | 3202086 B1 | * | 3/2021 | ......... | H04L 67/1001 |
| EP | 3867749 B1 | * | 12/2023 | ............ | G06F 9/4881 |
| ES | 2720759 T3 | * | 7/2019 | ............ | H04L 47/20 |
| FR | 3077403 A1 | * | 8/2019 | ......... | G06F 9/5077 |
| JP | 6254574 B2 | * | 12/2017 | ............ | H04L 48/70 |
| JP | 7113021 B2 | * | 8/2022 | ............ | G16Y 10/75 |
| JP | 7738134 B2 | * | 9/2025 | ......... | G06F 11/3684 |
| KR | 102108376 B1 | * | 5/2020 | ............ | G06F 11/261 |
| WO | WO-2006054436 A1 | * | 5/2006 | ............ | H04W 28/06 |
| WO | WO-2009142826 A1 | * | 11/2009 | ......... | G06F 9/45558 |
| WO | WO-2012078471 A1 | * | 6/2012 | ............ | G06F 9/4856 |
| WO | WO-2012087941 A1 | * | 6/2012 | ............ | H04L 47/70 |
| WO | WO-2013142041 A1 | * | 9/2013 | ............ | H04L 43/026 |
| WO | WO-2014032031 A2 | * | 2/2014 | ......... | G06F 9/5077 |
| WO | WO-2014166247 A1 | * | 10/2014 | ............ | H04L 41/40 |
| WO | WO-2015020949 A1 | * | 2/2015 | ............ | G06F 9/455 |
| WO | WO-2016050663 A1 | * | 4/2016 | ......... | H04L 41/0668 |
| WO | WO-2022046035 A1 | * | 3/2022 | ............ | H04L 41/40 |
| WO | WO-2023069729 A1 | * | 4/2023 | ............ | H04W 24/06 |
| WO | WO-2025074405 A1 | * | 4/2025 | ......... | G06F 9/45558 |
| WO | WO-2025181571 A1 | * | 9/2025 | ............ | H04L 41/40 |

OTHER PUBLICATIONS

Urbina, Moises et al: "Stimulation Enviroment Based on SystemC and VEOS for Multi-core Processors with Virtual AUTOSAR ECUs"; 2015 IEEE International Conference on Computer and Information Technology; Ubiquitous Computing and Communications; Dependable, Autonomic and Secure Computing; Pervasive Intelligence and Computing; IEEE; Oct. 26, 2015 (Oct. 26, 2015); pp. 1843-1852.

Tang Yijan et al:; "People's Posts and Telecommunications Press"; Mar. 31, 1993; Computer Practical Network Programming; p. 225.

* cited by examiner

| FIG. 4A | FIG. 4B |
|---------|---------|

400

700

| CAN Node | Identifier (Hex) | Identifier (Binary) |
|---|---|---|
| 1 | 0x7F3 | 11111110011 |
| 2 | 0x6B3 | 11010110011 |
| 3 | 0x6D9 | 11011011001 |

710   712

Example

| FIG. 8A | FIG. 8B |
|---------|---------|

SYSTEM AND METHOD FOR SIMULATION AND TESTING OF MULTIPLE VIRTUAL ECUS

TECHNICAL FIELD

The disclosed technology is directed to techniques for simulation and testing of virtual controllers and devices, including communications between the virtual controllers. Various implementations of the disclosed technology may be particularly useful for simulation and testing of multiple virtual automotive electronic control units.

BACKGROUND OF THE DISCLOSURE

An automotive electronic control unit (ECU) refers to any embedded system in automotive electronics that controls one or more of the electrical systems or subsystems in a vehicle. Types of ECU include engine control module, powertrain control module, transmission control module, brake control module, central control module, central timing module, general electronic module, body control module, suspension control module, and other controllers, control units, or control modules. Taken together, these systems are sometimes referred to as the car's computer. Sometimes one assembly incorporates several of the individual control modules.

Some modern motor vehicles have up to 200 ECUs. Embedded software in ECUs continues to increase in line count, complexity, and sophistication. Managing the increasing complexity and number of ECUs in a vehicle has become a key challenge for original equipment manufacturers (OEMs). For this reason, virtual ECUs (VECUs) are used to simulate the operations of individual ECUs without requiring each revision of an ECU to actually be manufactured and programmed Improved systems for simulating and testing ECUs are desirable.

SUMMARY OF THE DISCLOSURE

Various disclosed embodiments include a method performed by one or more computer systems. A method includes executing, by the one or more computer systems, a first virtual electronic control unit (VECU). The method includes executing, by the one or more computer systems, a virtual bus, the virtual bus associated with the first VECU. The method includes executing, by the one or more computer systems, at least one second VECU. The method includes simulating, by the one or more computer systems, a multiple-VECU system by managing communications, using the virtual bus, between the first VECU and the at least one second VECU.

In various embodiments, the first VECU and the at least one second VECU together represent a portion of an automobile control system. In various embodiments, the virtual bus converts communications in a first protocol from the first VECU using a protocol manager and transmits the communications to the at least one second VECU using an inter-process communication (IPC) channel. In various embodiments, the communications are transmitted in a carrier on the IPC channel, the carrier having a pilot field, a first-in-first-out (FIFO) field, and an acknowledgement (ACK) field. In various embodiments, the pilot field includes an identifier field, a frame definition field that defines a frame type and size of the FIFO field, and protocol field that identifies a protocol type of the FIFO field, and wherein the protocol type corresponds to the first protocol. Various embodiments include synchronizing execution of the first VECU and the at least one second VECU using the virtual bus. In various embodiments, the first VECU is designated a master VECU and synchronizing execution includes sending a synchronization message from the first VECU to the second VECU, causing the second VECU to advance execution by a predetermined virtual simulation time. In various embodiments, the first VECU is designated a master VECU and synchronizing execution includes sending a synchronization message from the first VECU to the second VECU, causing the second VECU to advance execution by a predetermined virtual simulation time, and not advancing execution of the first VECU until an acknowledgement message is received from the second VECU. Various embodiments include arbitrating, by the virtual bus, between a message sent by the first VECU and a message sent by a third VECU.

Disclosed embodiments include computer systems each having a processor and an accessible memory, configured to together perform processes as disclosed herein. Disclosed embodiments include a non-transitory computer-readable medium storing with executable instructions that, when executed, cause one or more computer systems to perform processes as disclosed herein.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
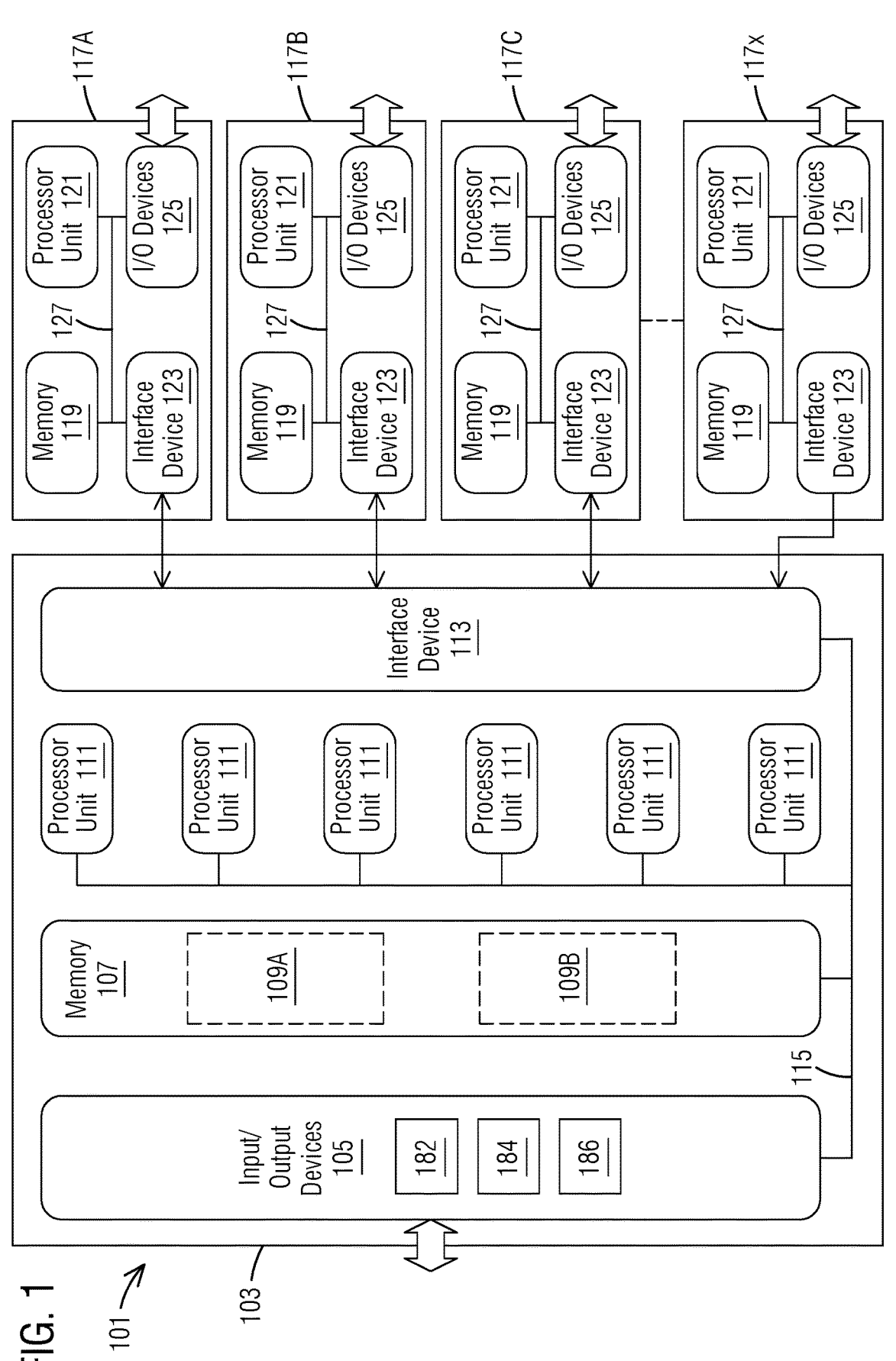
FIGS. 1 and 2 illustrate components of a computer system that may be used to implement various embodiments of the disclosed technology.

The Figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

General Considerations

Various aspects of the present disclosed technology relate to simulation and testing of multiple VECUs, in particular for automotive use, and communications between the various elements. In the following description, numerous details are set forth for the purpose of explanation. However, one of ordinary skill in the art will realize that the disclosed technology may be practiced without the use of these specific details. In other instances, well-known features have not been described in detail to avoid obscuring the present disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "perform", "partition," and "extract" to describe the disclosed methods. Such terms are high-level descriptions of the actual operations that are performed. The actual operations that correspond to these terms will vary depending on the particular implementation and are readily discernible by one of ordinary skill in the art.

Illustrative Operating Environment

The execution of various processes described herein may be implemented using computer-executable software instructions executed by one or more programmable computing devices. Because these processes may be implemented using software instructions, the components and operation of a generic programmable computer system on which various embodiments of these processes may be employed will first be described. Further, because of the complexity of some electronic design and testing processes and the large size of many circuit designs, various electronic design and testing tools are configured to operate on a computing system capable of simultaneously running multiple processing threads. The components and operation of a computer system having a host or master computer and one or more remote or slave computers therefore will be described with reference to FIG. 1. This operating environment is only one example of a suitable operating environment, however, and is not intended to suggest any limitation as to the scope of use or functionality of any implementations of the invention.

In FIG. 1, the computer system 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other non-transitory storage medium that can be used to store desired information. As used herein, the term "non-transitory" refers to the ability to store information for subsequent retrieval at a desired time, as opposed to propagating electromagnetic signals.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
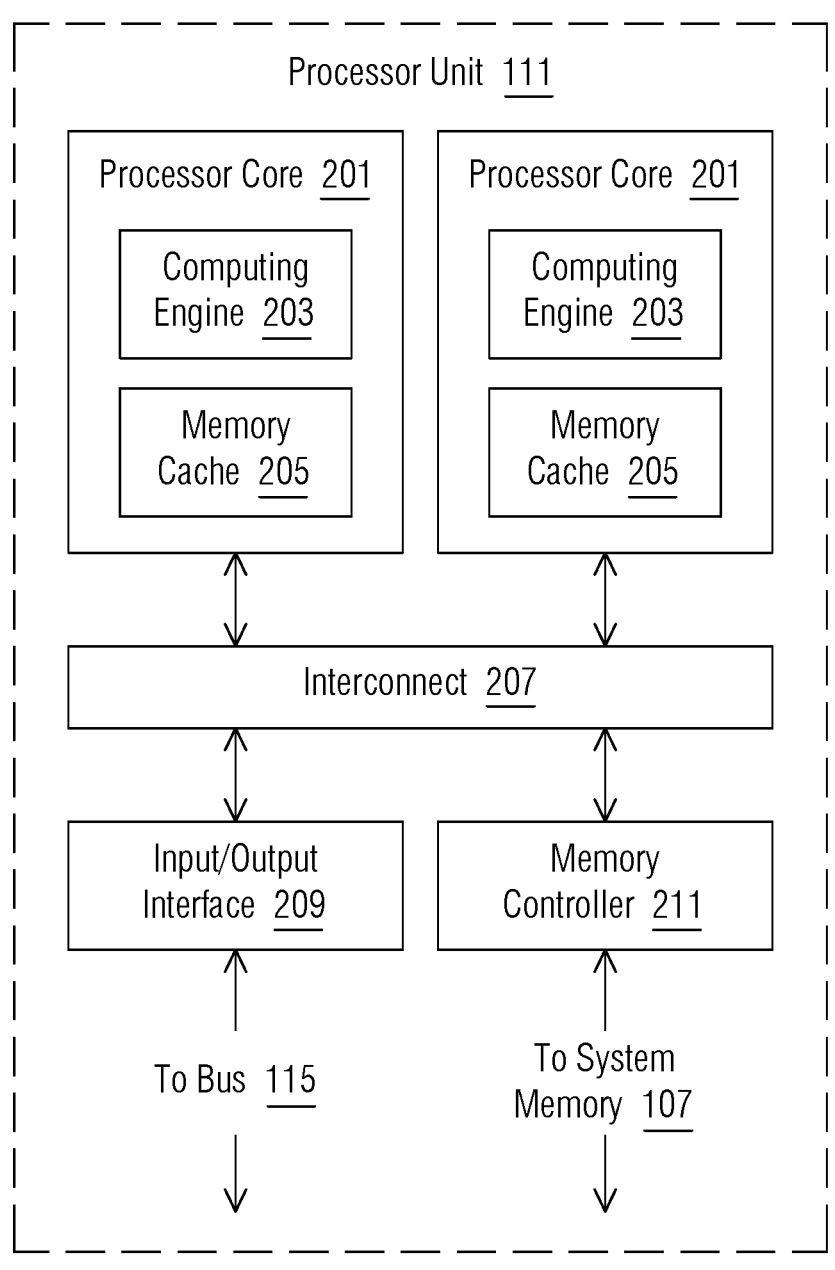

With some implementations of the invention, the master computer 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation, and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interfaces 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only, and is not intended to be limiting. It also should be appreciated that, with some implementations, a multi-core processor unit 111 can be used in lieu of multiple, separate processor units 111. For example, rather than employing six separate processor units 111, an alternate implementation of the computing system 101 may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the slave computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the slave computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each slave computer 117 may include a memory 119, a processor unit 121, an interface device 123, and, optionally, one more input/output devices 125 connected together by a system bus 127. As with the master computer 103, the optional input/output devices 125 for the slave computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel®. Pentium®. or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. The memory 119 then may be implemented using any combination of the computer readable media discussed above. Like the interface device 113, the interface devices 123 allow the slave computers 117 to communicate with the master computer 103 over the communication interface.

In the illustrated example, the master computer 103 is a multi-processor unit computer with multiple processor units 111, while each slave computer 117 has a single processor unit 121. It should be noted, however, that alternate implementations of the technology may employ a master computer having single processor unit 111. Further, one or more of the slave computers 117 may have multiple processor units 121, depending upon their intended use, as previously discussed. Also, while only a single interface device 113 or 123 is illustrated for both the master computer 103 and the slave computers, it should be noted that, with alternate embodiments of the invention, either the computer 103, one or more of the slave computers 117, or some combination of both may use two or more different interface devices 113 or 123 for communicating over multiple communication interfaces.

With various examples of the computer system 101, the master computer 103 may be connected to one or more external data storage devices. These external data storage devices may be implemented using any combination of non-transitory computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the computer system 101, one or more of the slave computers 117 may alternately or additions be connected to one or more external non-transitory data storage devices. Typically, these external non-transitory data storage devices will include data storage devices that also are connected to the master computer 103, but they also may be different from any data storage devices accessible by the master computer 103.

It also should be appreciated that the description of the computer system 101 illustrated in FIG. 1 and FIG. 2 is provided as an example only, and it not intended to suggest any limitation as to the scope of use or functionality of various embodiments of the invention.

Disclosed embodiments include improved systems and methods for interconnect multiple VECUs in a manner that allows them to exchange packets using a variety of protocols, including Controller Area Network bus (CAN bus) protocol and other protocols discussed herein. Various embodiments can model a system of many communicating VECUs, such as can be found in automotive vehicles. Disclosed embodiments include a virtual bus to exchange the packets among the VECUs. The virtual bus can use Inter-Process Communication (IPC) as a standard mechanism for establishing the channels among the VECUs. Disclosed embodiments enable running wide-range of applications on multiple VECUs including AUTomotive Open System Architecture (AUTOSAR) applications by simulating multiple VECUs, any of which can be executing real automotive applications. In various embodiments, the virtual bus can be ported to different operating systems, such as the MICROSOFT WINDOWS operating systems and the UNIX/LINUX operating systems.

According to various embodiments, the virtual bus maintains synchronization in the simulation time among all VECUs. Synchronization among the VECUs using the virtual bus is fully configurable based on the required simulation accuracy. Simulation can be configured to be fully asynchronous among different VECUs to achieve super performance for running the applications, or for debug and trace purposes, different VECUs can be configured to be synchronized during simulation. Among all VECUs in the system, any number of VECUs could be synchronized to achieve fully synchronous simulation for all VECUs. In an exemplary implementation, due to the re-configurability/flexibility of the virtual bus, simulation can be set to best/highest performance using asynchronous operation, and synchronization can be used only when needed to debug certain software issues on some specific VECUs.

Figure 3:
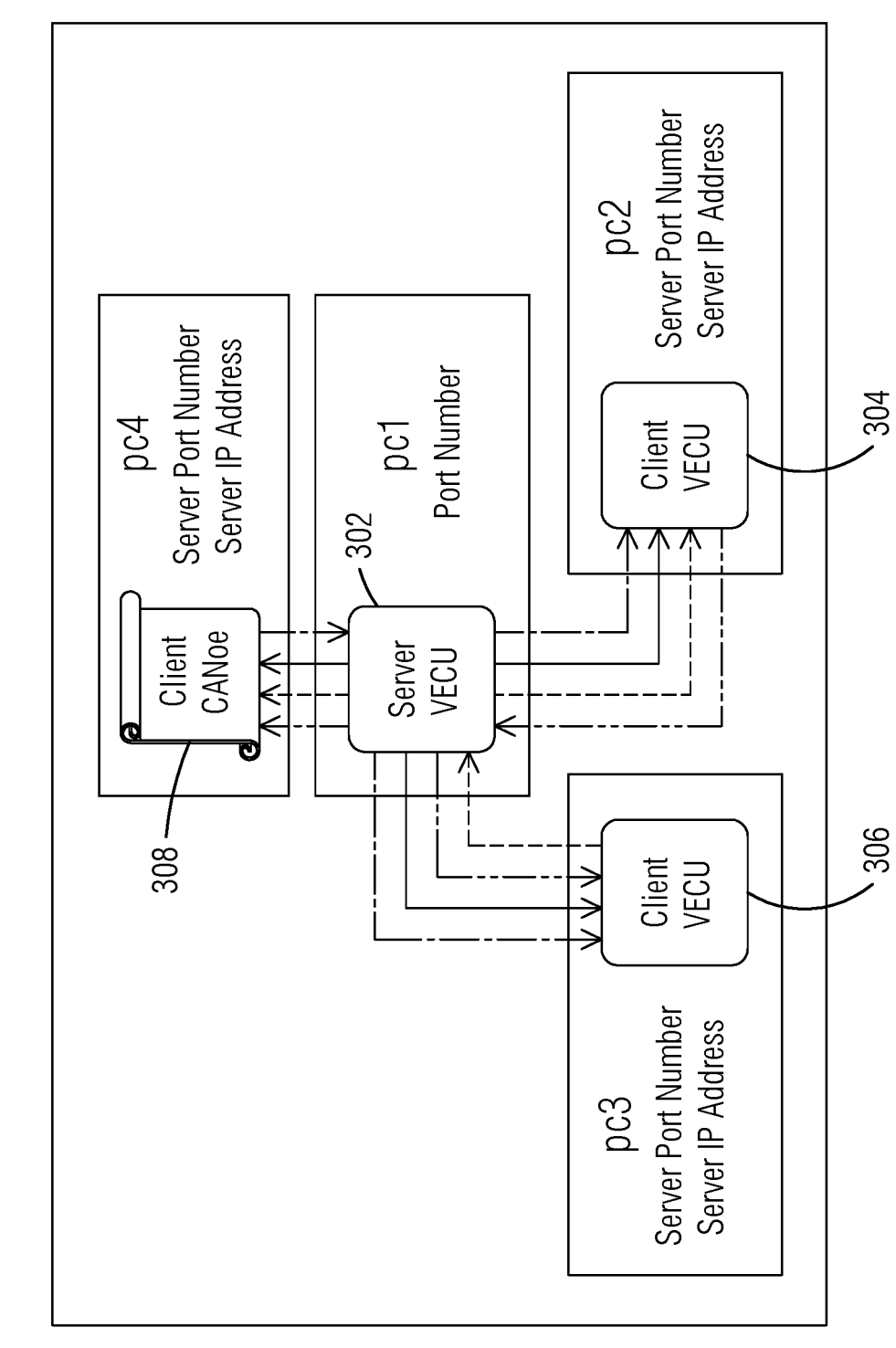
FIG. 3 illustrates an example of a VECU simulation system in accordance with disclosed embodiments.

FIG. 3 illustrates an example of a VECU simulation system 300 in accordance with disclosed embodiments that can be used for VECU testing. In this example, there are multiple intercommunicating elements: a server VECU 302, client VECUs 304 and 306, and a testing client 308, but disclosed embodiments can be implemented in any system with two or more intercommunicating elements. As described herein, there is not necessarily any structural difference between server VECU 302 and client VECUs 304 and 306; in many cases, depending on the operations being tested or simulated, one of the intercommunicating VECUs is simply designated as the server to the other VECUs. This example includes a testing client 308, which can operate an ECU testing application such as the CANOE software application by Vector.

The VECU simulation system 300 can be implemented using one or more individual computer systems as described herein. That is, each of the VECUs 302, 304, and 306, as well as any testing client 308 or other intercommunicating elements, can be implemented on the same physical hardware acting as a host machine, executing in different processes and communicating with each other within the VECU simulation system 300 in a manner as disclosed herein. In other embodiments, one or more of the intercommunicating elements can be implemented on separate physical hardware, connected so that they can communicate as disclosed herein.

Those skilled in the art will recognize that, for simplicity and clarity, the full structure and operation of all data processing systems or computer systems suitable for use with the present disclosure is not being depicted or described herein. Instead, only so much of a data processing system or computer system as is unique to the present disclosure or necessary for an understanding of the present disclosure is depicted and described. The remainder of the construction and operation of the data processing system may conform to any of the various current implementations and practices known in the art.

Disclosed embodiments can accommodate different protocols to support inter-process communication (IPC) among different VECUs, and in particular embodiments use Transaction Level Modeling (TLM) to implement a virtual bus among VECUs. This virtual bus can function as a virtual automotive bus. For example, each of the communication paths in VECU simulation system 300 of FIG. 3 can be implemented with TLM on a virtual bus. In such an implementation, TLM sockets can be created in each VECU of the VECU simulation system to allow the communication.

Various embodiments can address timing related issues using a product such as the SYSTEMC design and verification language of Accellera Systems Initiative as a virtual hardware timing protocol in one or more of the VECUs. Such a virtual hardware timing protocol allows the system or user to configure hardware-oriented delays for synchronization and recognizing the hardware (HW) parameters inside the VECUs. In various embodiments, the TLM transactions on the virtual bus are detected from the created TLM sockets at the same virtual hardware timing protocol time (for example at T=0).

Figures 4, 4A:
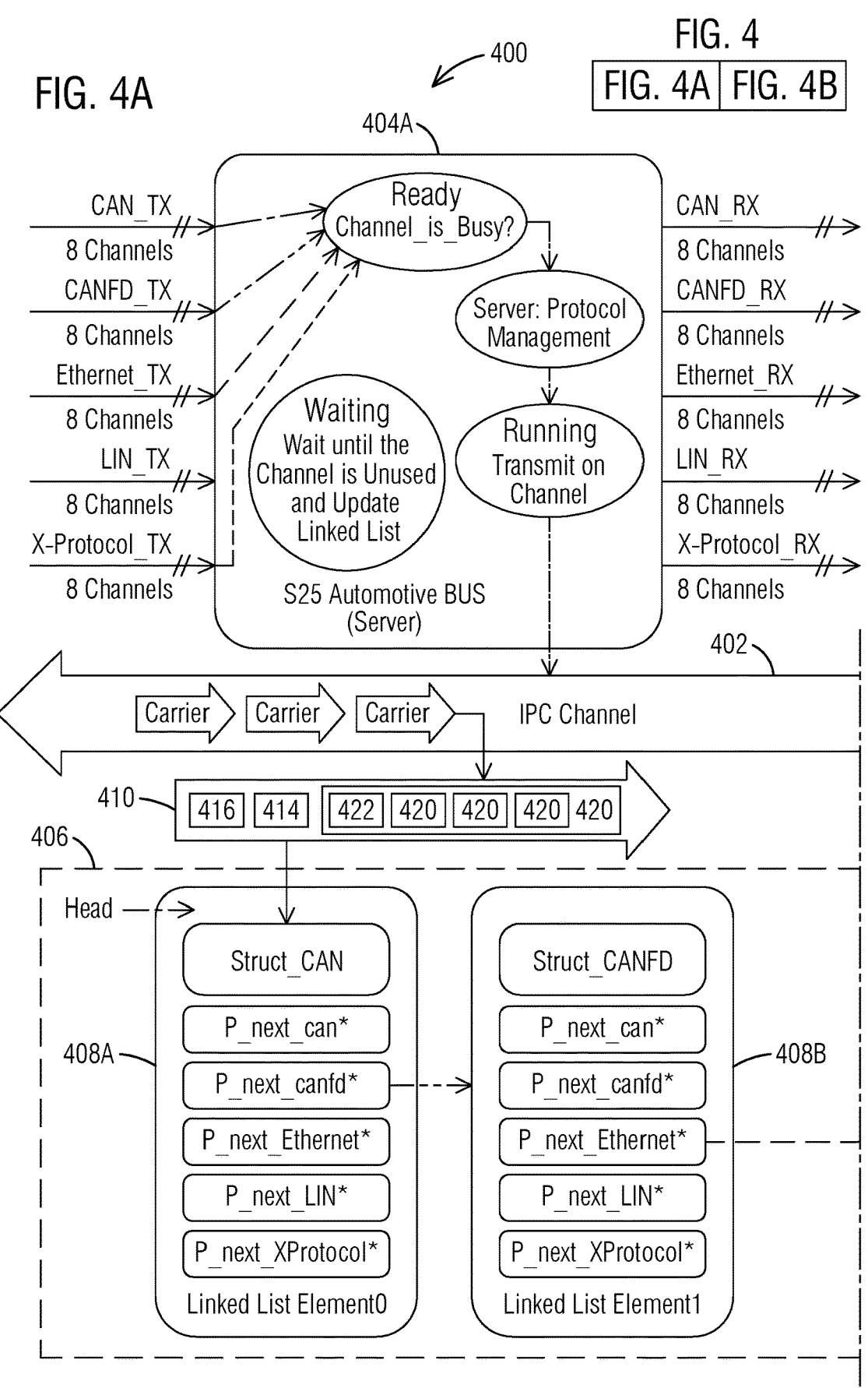
FIG. 4, shown as FIGS. 4A and 4B, illustrates an example of a virtual communication bus architecture and associated data structure in accordance with disclosed embodiments.
Figure 4B:
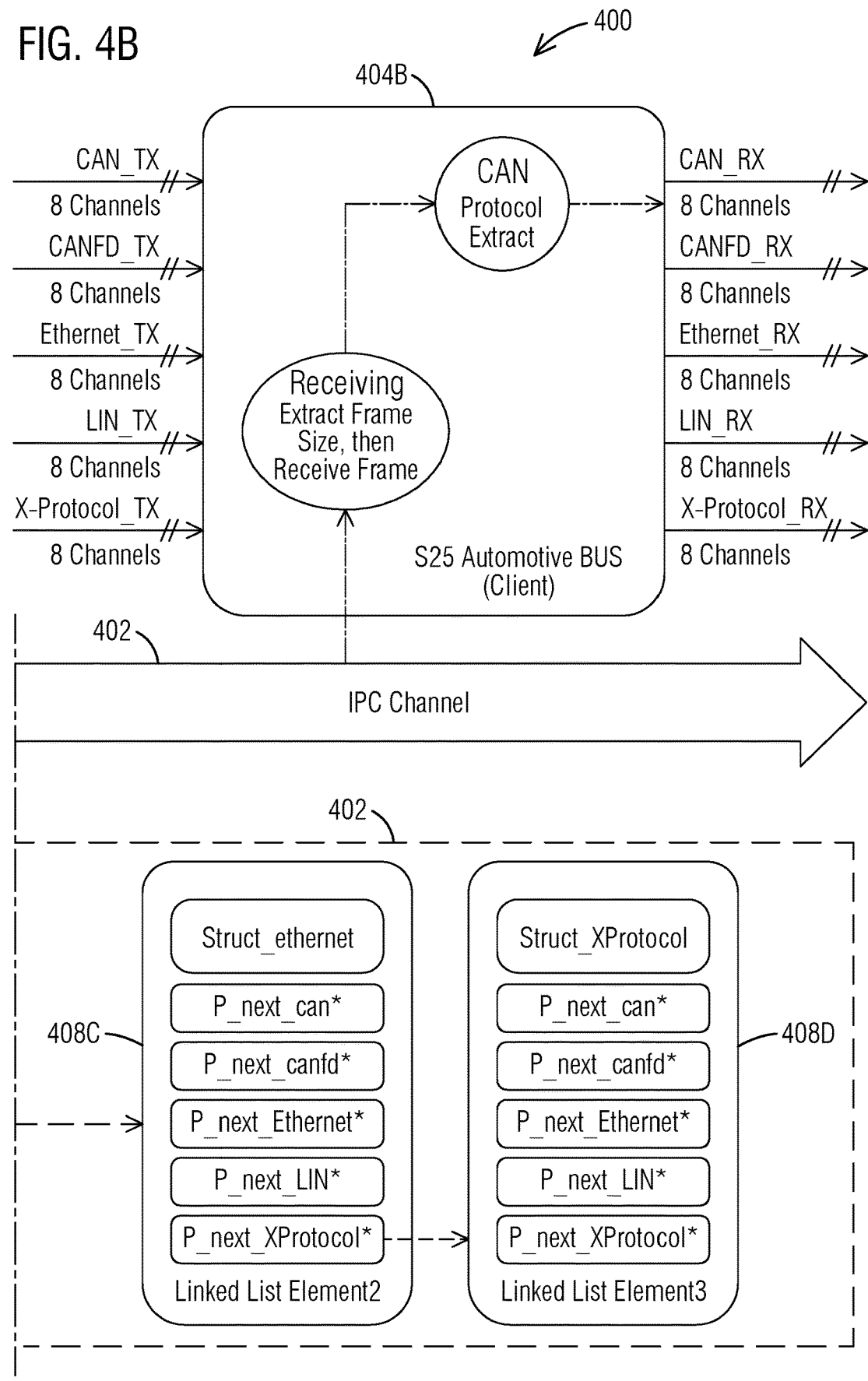

As noted above, a system as disclosed herein is protocol independent. FIG. 4 illustrates an example of a virtual communication bus architecture 400 and associated data structure in accordance with disclosed embodiments. Virtual communication bus architecture 400 includes an IPC channel as part of a virtual bus 402 connected to each of the VECUs 404A and 404B (or, collectively, VECUs 404) to pass communications between them. Note that this example only illustrates a single IPC channel in virtual bus 402, but other embodiments can include multiple IPC channels in a virtual bus 402.

Specific embodiments achieve this by instantiating a first-in-first-out (FIFO) queue 406, such as using a dynamic linked list, to receive different transactions of any implemented protocol with a unified structure. FIFO queue 406 stores FIFO elements 408A-408D (or, collectively, FIFO elements 408). FIFO queue 406 can contain any number of FIFO elements 408. FIFO elements 408 are transmitted in a carrier 410, where carriers 410 are transported on the virtual bus 402. The carrier 410 contains three main fields: pilot field 412, FIFO field 414, and ACK field 416. Separate FIFO queues can be used for data being sent by a specific VECU and data being received by that VECU.

The pilot field 412 is a structure which is used to identify the carrier, the frame type and size, and the frame protocol. Each carrier 410 has a pilot field 412 to distinguish different carriers from each other. The pilot field contains three fields: a fixed-size identifier field 418 that identifies the carrier 410, a fixed-size frame definition field 420 that contains the frame type and size of the frame being transported by that carrier, and a dynamic-size protocol field 422 that contains the protocol type of the frame being transported by that carrier, such as CAN, Controller Area Network Flexible Data-Rate (CANFD), or others.

FIFO field 414 is dynamic in size and depends on the transmitted frame format, and is used to point to the current FIFO element 408 in FIFO queue 406. The ACK field 416 contains the size of the frame which is received and is returned to the sending element by a receiving element to verify receiving the frame.

FIFO queue 406 is a linked list of FIFO elements 408A-408D, which can be different structures based on the frame type. As illustrated in FIG. 4, FIFO field 414 of carrier 410 is pointing to the first FIFO element 408A in the FIFO queue 608. FIFO element 408A, in this example, is a CAN structure. FIFO element 408A points to the second FIFO element 408B, which is a CANFD structure that will be transported on another carrier (typically the next carrier after carrier 410), etc.

As illustrated in FIG. 4, each FIFO element 408 can include a pointer to the next FIFO element 408 that identifies the structure of the next FIFO element. For example, FIFO element 408A includes a "P_next_canfd" pointer to the next FIFO element 408B, which has a CANFD structure. FIFO element 408B includes a "P_next_ethernet" pointer to the next FIFO element 408B, which has an Ethernet structure.

The IPC channel allows connecting many VECUs 404 using server-client socket pairs, so that a given virtual bus as described herein may support multiple IPC channels, and each channel can be assigned a specific port number. A given virtual bus 402 preferably contains only one VECU as a server VECU and a defined number of client VECUs. In the example FIG. 4, there are two VECUs 404, where VECU 404A acts as a server and VECU 404B acts as a client. Each VECU 404 has different master/slave ports for supported protocols, such as CAN, local interconnect network (LIN), Ethernet, CANFD and XProtocol. The ports can be implemented, for example, using the SYSTEMC TLM product by Accellera Systems Initiative. All ports should be connected to the desired controllers.

Each VECU 404 can implement a finite state machine (FSM) for communication functions. VECU 404A, as illustrated, is acting as a server VECU. Its states for sending a packet can include:

Ready State, in which packets are passed on to fill in the frame according to each protocol. The IPC channel is checked to determine if it is busy or not to transmit the carrier. If the IPC channel is busy, the FSM for VECU 404A moves to the Waiting State. If the IPC channel is not busy, the FSM for VECU 404A can transition to the Server State (if protocol management is needed) or the Running State. The VECU 404A can enter the Ready states after any packets are received over TLM sockets and are ready to be transmitted;

Waiting State, where the server VECU can wait for virtual bus 402 to be cleared and update its linked lists as appropriate. The VECU 404A FSM remains in this state as long as the IPC channel is busy. Once the Channel is ready (not busy), the FSM for VECU 404A is moved from the Waiting State to the Running State (or first to Server State for protocol management functions and then to Running State);

Server State, in which the server VECU performs protocol management functions; and Running State, in which the server VECU transmits on virtual bus 402. The Running State is responsible for sending and receiving the packet based on the specific protocol management and based on being a server or a client.

These exemplary states are non-limiting, and only describe some communication-function states. Specific implementations may have more or different communication-function states. The remainder of the operation of each server VECU is not limited to any specific state machine or corresponding states.

VECU 404B, as illustrated, is acting as a client VECU. Its communication-function states for receiving a packet can include:

Receiving State, in which the client VECU can receive from virtual bus 402. In this state, the VECU 404B can parse the packet and extract the information based on the protocol, then send the information to a protocol Extract State corresponding to that protocol; and Protocol Extract State, in which the client VECU extracts data from the carrier, in whichever protocol it was transmitted. In this state, the data is extracted based on the protocol use (e.g., CAN protocol extract state). Frame fields can be passed to the TLM socket which is connected to controller corresponding to the protocol (a CAN controller, for example).

These exemplary states are non-limiting, and only describe some communication-function states. Specific implementations may have more or different communication-function states. The remainder of the operation of each client VECU is not limited to any specific state machine or corresponding states.

Different transactions on the TLM ports happening on the same hardware time (such as in the SYSTEMC TLM product) can be buffered on a linked list as a separate frame element.

The virtual bus can operate in different synchronization modes. In asynchronous mode, the synchronization of simulation among different VECUs is not guaranteed. This mode can be configured by setting a simulation parameter in the VECU simulation system 300. Most physical systems including many VECUs, such as an automotive system, are asynchronous systems and timing between the various ECUs is not maintained.

FIG. 3 can be used to illustrate an example of the differences in synchronization modes in accordance with disclosed embodiments. In asynchronous mode, any inter-communicating element (node) can send/receive at any time. The VECUs 302, 304, 306 run in different execution times (ET) although they have the same VST. VST and ET are completely independent for all VECUs 302, 304, 306. For example, if a system of multi VECUs runs for ET=1 s, the server VECU 302 is simulated for VST=120 ms while a client VECU 304 is simulated for VST=900 ms (since they are running asynchronously). The simulation speed of each VECU depends on such factors as host CPU clock, RAM, the tasks performed by each VECU, etc.

Significant advantages of asynchronous mode include very high performance since the simulation of any node is not stopped, and each node runs freely to achieve the highest possible performance. Further, the functionality of individual VECUs and their intercommunications can be easily verified since timing among VECUs is not to be tracked. Disadvantages of asynchronous mode are simply that there is no synchronization for the VECUs simulation and debugging multiple VECUs is not possible unless the operation is not tightly coupled to timing, since simulation of each VECU is completely independent.

Disclosed embodiments can implement different synchronous modes including a server synchronous mode and a server-client synchronous mode.

In the server synchronous mode, using the example of FIG. 3, the server VECU 302 is chosen because it is (in this example) the VECU with the largest execution time among the various VECUs. The server VECU 302 sends a synchronization message to all clients (including client VECUs 304 and 306 at each execution step, and can include testing client 308) to proceed with the execution. The server does not wait for any acknowledge message for the clients to proceed. Since client VECUs 304 and 306 are faster than server VECU 302, and must wait on the server VECU communications so that they can proceed, operations are forced to be synchronized to the slower speed of server VECU 302 without requiring further synchronization messaging. Note that in some embodiments, where the server VECU or client VECU is described as sending a message, a virtual bus associated with that server VECU or client VECU may actually generate, send, or receive the corresponding message.

A server synchronous mode provides several significant advantages, including that it allows debugging of the server VECU, and provides a relatively high performance since the only limiting factor is the server VECU speed. That is also the primary disadvantage—that the slowest VECU (with the maximum ET) must be the server and so the execution speed is limited to that of the slowest VECU. Note that, in various embodiments, any VECU can be configured to act as a server VECU or a client VECU using a configuration parameter. In a single system, for example, while there is preferably only one VECU configured to act as a server VECU, there can be many VECUs configured to act as client VECUs (as many as 99 or more).

Figure 5:
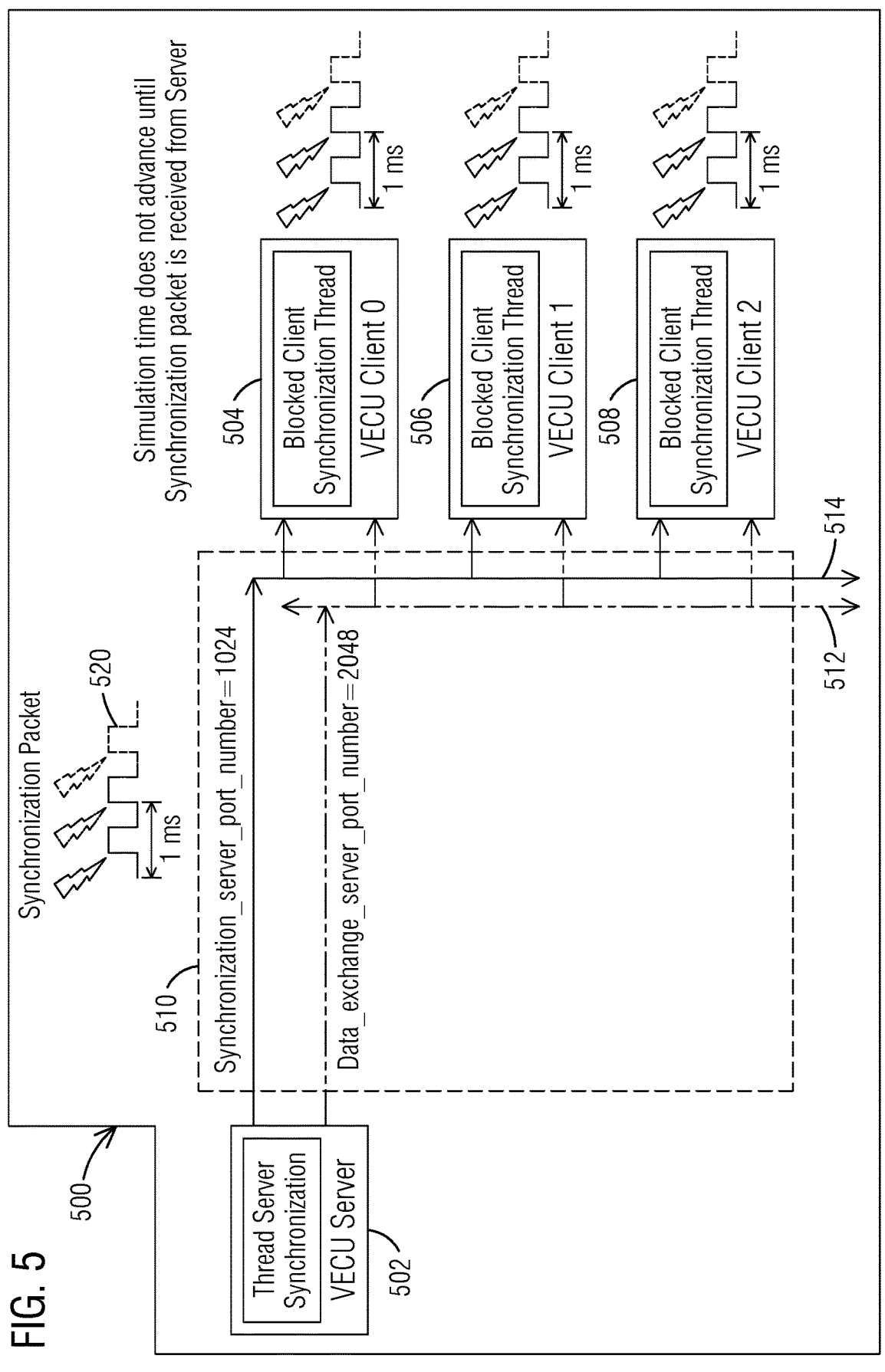
FIG. 5 illustrates an example of a VECU simulation system in accordance with disclosed embodiments operating in server synchronous mode.

FIG. 5 illustrates an example of a VECU simulation system 500 in accordance with disclosed embodiments operating in server synchronous mode. In this example, there are multiple intercommunicating elements: a server VECU 502 and client VECUs 504, 506, and 508, but disclosed embodiments can be implemented in any system with two or more intercommunicating elements. As described herein, there is not necessarily any structural difference between server VECU 502 and client VECUs 504, 506, and 508; the practical difference in this server synchronous mode example is that server VECU 502 is the VECU with the largest execution time among the various VECUs. The virtual simulation time (VST) as used herein refers to the virtual time used for each step of execution for a VECU, which may be a virtual clock speed, a selected duration, or otherwise.

In this example, server VECU 502 and client VECUs 504, 506, and 508 intercommunicate using virtual bus 510, which supports, in this example, at least two IPC channels 512 and 514. In this example, IPC channel 512 is used as a data exchange channel and operates on an available port on the host machine, using port 2048 as merely an example. IPC channel 514 is used as a synchronization channel and operates on another available port on the host machine port, using port 1024 in this example.

In this example, server VECU 502 executes a server synchronization thread (in addition to whatever other VECU applications or processes it is executing) that generates a synchronization packet 520 at whatever speed VECU 502 operates, or at a selected rate, every 1 ms in this example.

Each of the client VECUs 504, 506, and 508 executes a client synchronization thread (in addition to whatever other VECU applications or processes it is executing) that blocks advancing the synchronization time of that client VECU until it receives the synchronization packet from the server VECU 502. That is, instead of each client VECU 504, 506, and 508 operates at its own execution time/clock at its fastest speed, the VST of each client VECU 504, 506, and 508 is limited to the rate at which it receives synchronization packets from the server VECU 502, in this case every 1 ms.

In the server-client synchronous mode, the execution is guaranteed to be fully synchronous among all VECUs. Accordingly, not only the clients wait for the synchronization message from the server, but also the server waits for an acknowledgment message from all clients to be able to proceed with the execution. According to various embodiments, the acknowledgement message sent from a client to a server can indicate that the client has received the synchronization message and will proceed, or can indicate that the client has received the synchronization message, performed the next step of its own execution, and has advanced its own VST to match that of the server and its synchronization message. The acknowledgement message can be implemented using the ACK field discussed above.

A server-client synchronous mode provides several significant advantages, including that all VECUs have the same VST. In this mode, all VECUs can be debugged since the VECU simulation system pauses until simulation for all VECUs advances. The primary disadvantage of a server-client synchronous mode as disclosed herein is that performance is minimum since the system is fully synchronized; the system can operate no faster than the slowest VECU, and will typically operate more slowly to accommodate both the slowest VECU and the synchronization message and responses from each client VECU.

Figure 6:
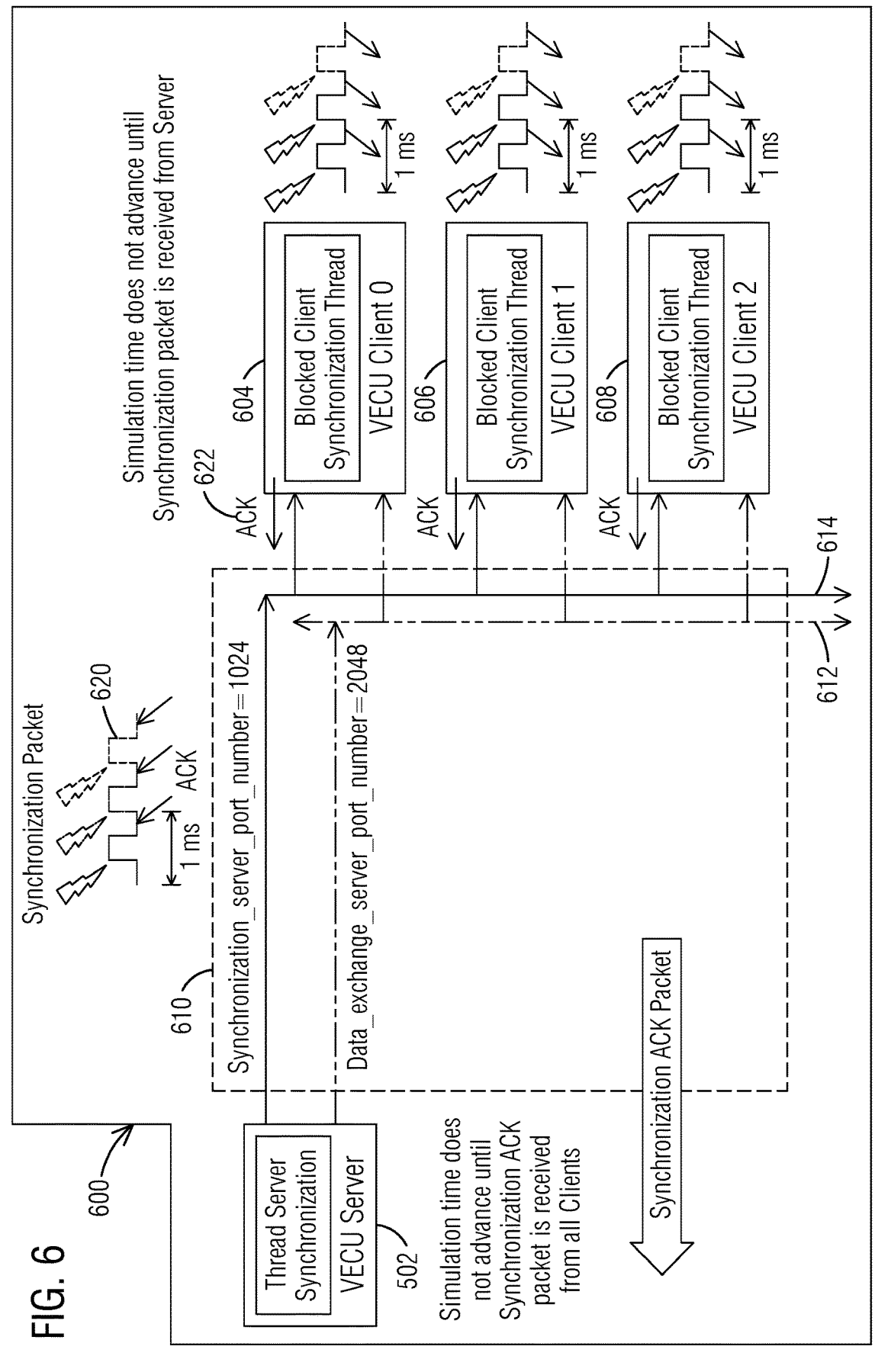
FIG. 6 illustrates an example of a VECU simulation system in accordance with disclosed embodiments operating in server-client synchronous mode.

FIG. 6 illustrates an example of a VECU simulation system 600 in accordance with disclosed embodiments operating in server-client synchronous mode.

In this example, there are multiple intercommunicating elements: a server VECU 602 and client VECUs 604, 606, and 608, but disclosed embodiments can be implemented in any system with two or more intercommunicating elements. As described herein, there is not necessarily any structural difference between server VECU 602 and client VECUs 604, 606, and 608; one practical difference in this server synchronous mode example is that server VECU 602 need not be the VECU with the slowest execution time among the various VECUs.

In this example, server VECU 602 and client VECUs 604, 606, and 608 intercommunicate using virtual bus 610, which supports, in this example, at least two IPC channels 612 and 614. In this example, IPC channel 612 is used as a data exchange channel and operates on an available port on the host machine, using port 2048 as merely an example. IPC channel 614 is used as a synchronization channel and operates on another available port on the host machine port, using port 1024 in this example.

In this example, server VECU 602 executes a server synchronization thread (in addition to whatever other VECU applications or processes it is executing) that generates a synchronization packet 620 when it advances its own execution time.

Each of the client VECUs 604, 606, and 608 executes a client synchronization thread (in addition to whatever other VECU applications or processes it is executing) that blocks advancing the synchronization time of that client VECU until it receives the synchronization packet from the server VECU 602. That is, instead of each client VECU 604, 606, and 608 operating at its own execution time/clock at its best speed, the execution time of each client VECU 604, 606, and 608 is limited to the rate at which it receives synchronization packets from the server VECU 602, in this case every 1 ms.

When each client VECU 604, 606, and 608 receives the synchronization packet 620, it sends an acknowledgement packet 622 confirming that it has received the synchronization packet 620 and advanced its execution time. Only after server VECU 602 has received all synchronization packets 620 does it advance its own execution time. In this way, the execution times of server VECU 620 and each client VECU 604, 606, and 608 are completely synchronized.

For example, based on its own execution time, server VECU 602 may send periodic synchronization packet 620 each time period which might be suitable for the system execution, in that example it is 12 ms, to advance execution time of the VECU simulation system 600. Each client VECU can send a response packet periodically, such as each 3 ms, and that response packet can be an acknowledgement packet 622 each time a synchronization packet 620 is received. This effectively maintains the synchronization of VECU simulation system 600 at one advance of execution time of all VECUs every known time period (12 ms for this example).

A VECU simulation system as disclosed herein can also arbitrate among accesses by different VECUs to the virtual bus.

In real-world ECU implementations, a collision may occur on the physical shared media, such as a CAN bus, when two or more nodes in the network are attempting to access the bus at almost the same time, which may result in unwelcome effects, such as bus access delays or even destruction/damage of messages. The CAN protocol, for example, averts message/data collisions by using the message ID of the node. That is, the message with the highest priority (in the CAN protocol, the lowest message ID) will gain access to the bus, while all other nodes (with lower priority and higher message IDs) switch to a "listening" mode.

Disclosed embodiments can simulate and perform arbitration for collisions on the virtual bus to properly simulate a corresponding physical ECU implementation. For example, the server-client synchronous mode can simulate reproduce such collisions since all lVECUs are fully synchronized and have the same execution time, such as a SYSTEMC time reference, even if they execute on different physical or virtual machines. Two or more VECUs/nodes can send the ID at the same time in a VECU simulation system as disclosed herein. The virtual bus handles arbitration to simulate collisions on a physical bus.

Specific technical advantages of a VECU simulation system as disclosed herein include the ability to handle different VECUs using different protocols on the same IPC socket on the virtual bus and providing a synchronization mechanism for different VECUs that may be running at different speeds or using different kernels, such as different SYSTEMC kernels.

Figure 7:
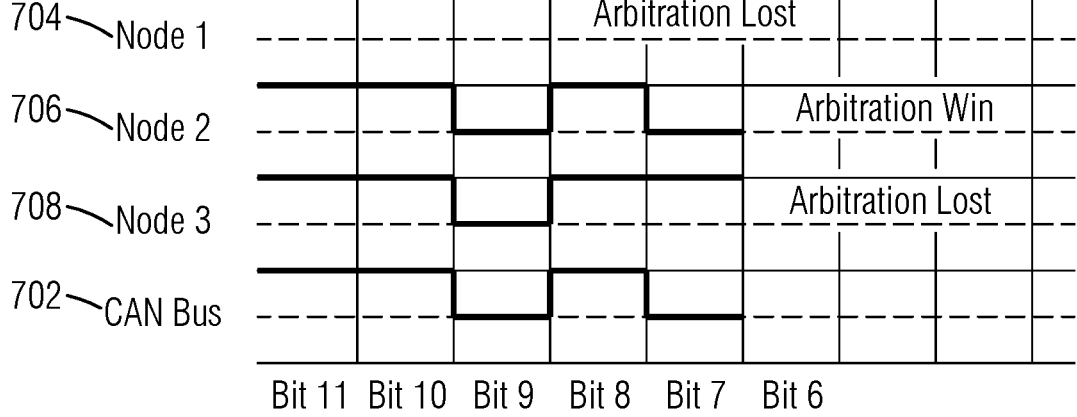
FIG. 7 illustrates an example of arbitration on a virtual bus in accordance with disclosed embodiments.

FIG. 7 illustrates an example of performing arbitration 700 among three VECU nodes 704, 706, and 708 sending at the same simulation time over the same virtual CAN bus 702. As described above, virtual bus 702 maintains correct arbitration among the three VECUs 704, 706, and 708 to avoid contention on the bus, using message identifiers 710 (in hexadecimal format) or 712 (in binary format). The lowest message identifier (710 or 712 in this example) corresponds to node 2 706, and that message is shown on the virtual CAN bus 702. This arbitration is particularly useful in a server-client synchronized mode, where there will more likely be message collisions, and properly simulates message collision and arbitration on a physical ECU network.

Figures 8, 8A:
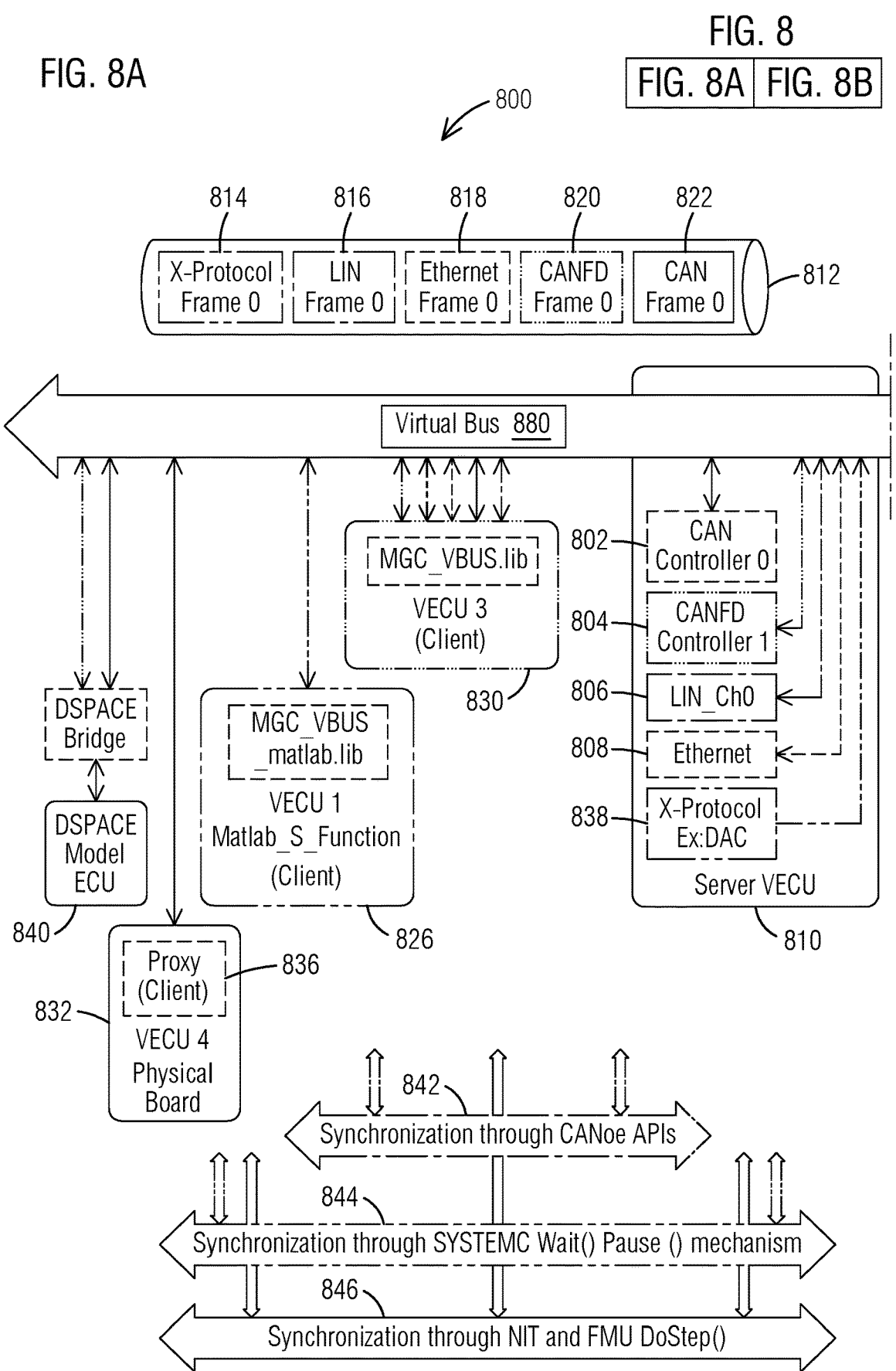
FIG. 8, shown as FIGS. 8A and 8B, illustrates a VECU simulation system integrated with other systems in accordance with disclosed embodiments.
Figure 8B:
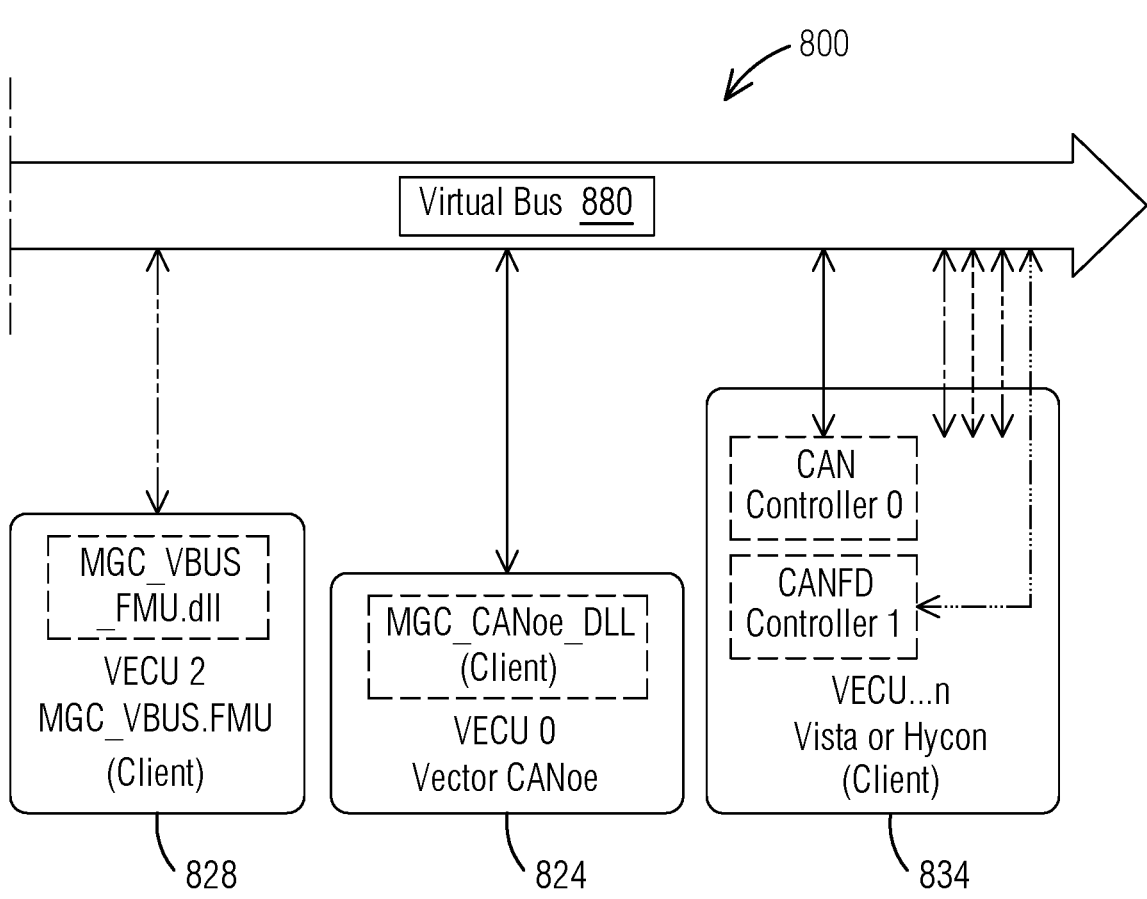

FIG. 8 illustrates a VECU simulation system 800 in accordance with disclosed embodiments, used to illustrate various features that can be implemented in various embodiments. Note that any given implementation can include individual ones of the features discussed herein, multiples of them, or all of them.

This figure illustrates a server VECU 810 connected to a virtual bus 880 as disclosed herein. Also connected to virtual bus 880 are client VECUs VECU 0 824, VECU 1 826, VECU 2 828, VECU 3 830, VECU 4 832, and, generally, VECUs 5 . . . n 834.

As illustrated in this figure, server VECU can communicate using one or more of a variety of protocols, assisted by software communication adapters/interfaces as may be necessary. In this example, server VECU 810 can communicate on virtual bus 880 using one or more of CAN interface 802, CANFD interface 804, LIN interface 806, Ethernet interface 808, or other protocol interface (X-Protocol interface) 830. While a server VECU 810 may not implement or use each of these interfaces in any given simulation, this figure serves to illustrate that disclosed embodiments can accommodate any protocol as necessary. The communications sent by server VECU 810 and other connected devices and processes are sent on virtual bus 880 in one or more IPCs. Each IPC transports carriers as illustrated herein and described above for example with respect to FIG. 4, and each carrier can specify the corresponding protocol being used for that carrier. In this example, exemplary carriers, include a LIN-protocol carrier 816, an Ethernet-protocol carrier 818, a CANFD-protocol carrier 820, and a CAN-protocol carrier 822, as well as a generic other-type of protocol (X-Protocol) carrier 814.

A VECU simulation system 800 in accordance with disclosed embodiments can accommodate any number of different protocols and devices (real or virtual). For example, VECU 824 can be a VECTOR CANOE tool, connected to communicate with virtual bus 880 via a software communication adapter implemented as a CANOE dynamic linking library interface. VECU 826 can be a MATLAB tool, connected to communicate with virtual bus 880 via a software communication adapter implemented as a library interface. VECU 828 can be a Functional Mock-Up Interface (FMI) tool, connected to communicate with virtual bus 880 via a software communication adapter implemented as an FMI dynamic linking library interface. VECU 830 can be a VELOCE emulation platform tool from Mentor Graphics Corporation, or a VECU implemented using the MICROSOFT VISUAL STUDIO product, connected to communicate with virtual bus 880 via a software communication adapter implemented as a library interface. VECU 832 can be a physical board such as a physical ECU, connected to communicate with virtual bus 880 via a software communication adapter acting as a VECU proxy between the physical board and the virtual bus 880. Any number of other VECUs can be implemented, represented as VECUs 5 . . . n 834, and can connect using any appropriate interface, such those described above, CAN or CANFD controllers, or others. Also illustrated here is a DSPACE model ECU 840, connected to communicate with virtual bus 880 via a software communication adapter implemented as a DSPACE bridge.

FIG. 8 also illustrates various protocols that can be used to achieve synchronization or otherwise control execution times as described herein. For example, various real or virtual devices or processes can utilize synchronization through CANOE application programming interfaces as illustrated at 842, through SYSTEMC mechanisms as illustrated at 844, or through FMI Functional Mockup Units and/or non-intrusive tracing (NIT) as illustrated at 846, or others.

Figure 9:
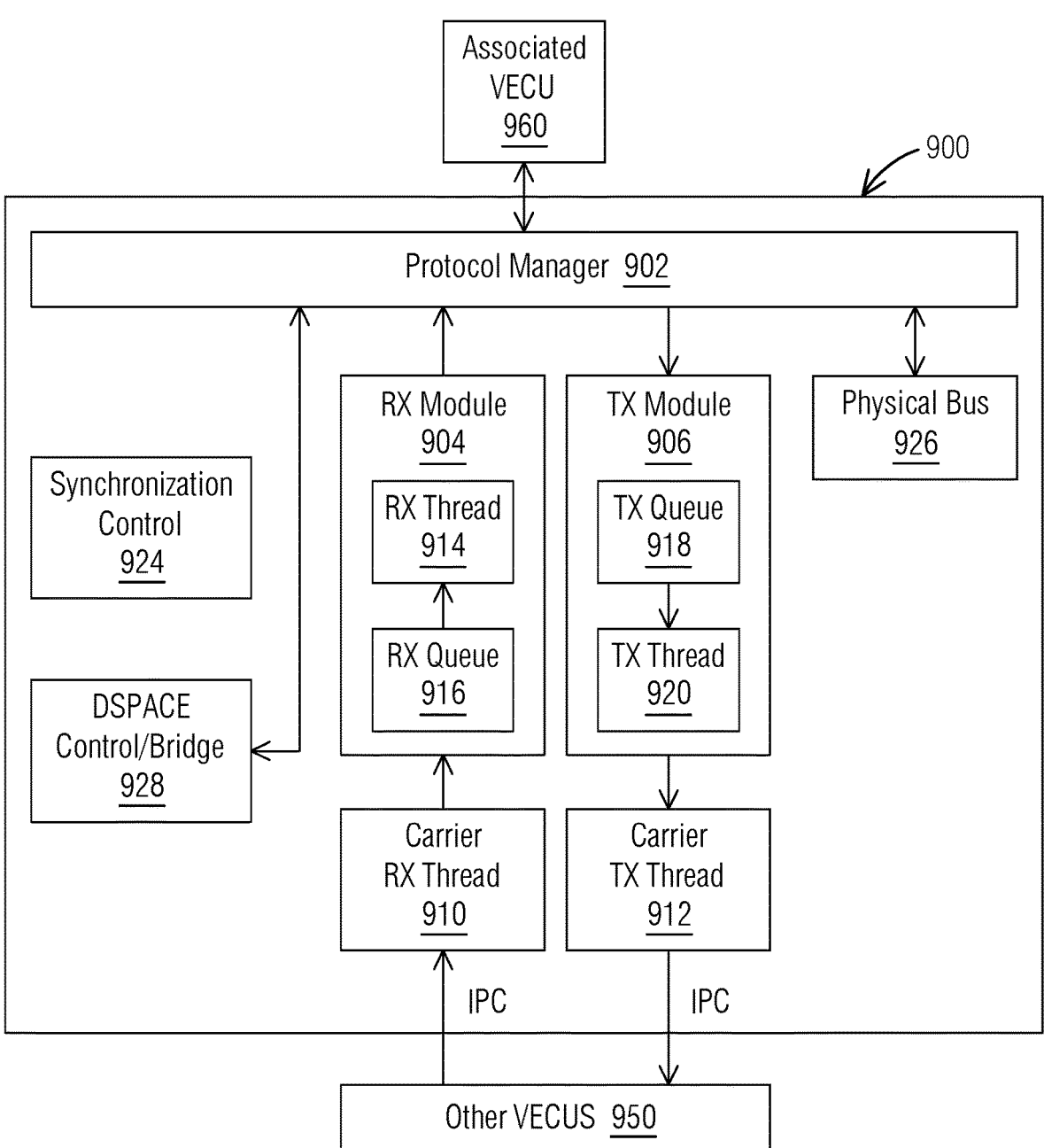
FIG. 9 illustrates an architecture of a virtual bus in accordance with disclosed embodiments.

FIG. 9 illustrates an architecture of a virtual bus 900 in accordance with disclosed embodiments. In this example, virtual bus 900 is associated with a specific VECU—in this case associated VECU 960 operating as a client VECU—and communicates with one or more other VECUs 950, including at least a server VECU and potentially multiple other client VECUs. Of course, the logical structure of the virtual bus 900 is the same whether the associated VECU 960 is operating as a server VECU or as a client VECU. Virtual bus 900 acts as the interface between associated VECU 960, other VECUs 950, and other external devices as described herein.

In this example, protocol manager 902 of virtual bus 900 interacts with associated VECU 960, using any number of channels and protocols as described herein, including CAN, CANFD, Ethernet, LIN, or other protocols. Protocol manager 902 manages data sent to and received from other devices and converts protocols as necessary, using any of the techniques, libraries, or other tools discussed herein.

When associated VECU 960 is transmitting data, for example, it transmits that data to protocol manager 902 using whatever protocol it supports. Protocol manager can then convert that data for transmission as described herein, passing it to a transmission (TX) module 906. TX module 906 adds the converted data to a TX queue 918, such as a FIFO queue described above, and sends the queued data via TX thread 920 to a carrier TX thread 912, which puts the converted data into a carrier format as described above. The carrier TX thread 912 then transmits that data, using IPC in this example, to one or more of the other VECUSs 950.

When associated VECU 960 is receiving data, the opposite process is performed. The received data, in a carrier format, is received via IPC from one of the other VECUs 950. Carrier RX thread 910 receives the carrier-format data and extracts the frames or other data described above from the channel. The data is passed to a receive (RX) queue 916 of RX module 904, such as a FIFO queue described above. RX thread 914 of RX module 904 passes the data from the RX queue 916 to the protocol manager 902, which converts it for use by and sends it to associated VECU 960.

Virtual bus 900 can also communicate between associated VECU 960 and devices other than other VECUs 950. For example, protocol manager 902 can communicate with a DSPACE control/bridge so that associated VECU 960 can communicate with a DSPACE model ECU. Protocol manager 902 can communicate with one or more physical buses 926 so that associated VECU 960 can communicate with one or more connected physical devices. For example, physical bus 926 can be an Ethernet connection enabling communications with an external Ethernet-based system such as an automotive Ethernet. Physical bus 926 can be a physical CAN bus enabling communications with an external controller or other device utilizing the CAN protocol or the CANFD protocol. Physical bus 926 can be used to support communications with any other physical device using any protocol, converted by protocol manager 902.

Virtual Bus 900 can also include a synchronization control 924 that synchronizes transmissions and executions as described herein. For example, synchronization control 924 can include or implement such elements as a SYSTEMC kernel and send/receive threads or other timing/synchronization data described herein or known to those of skill in the art.

Figure 10:
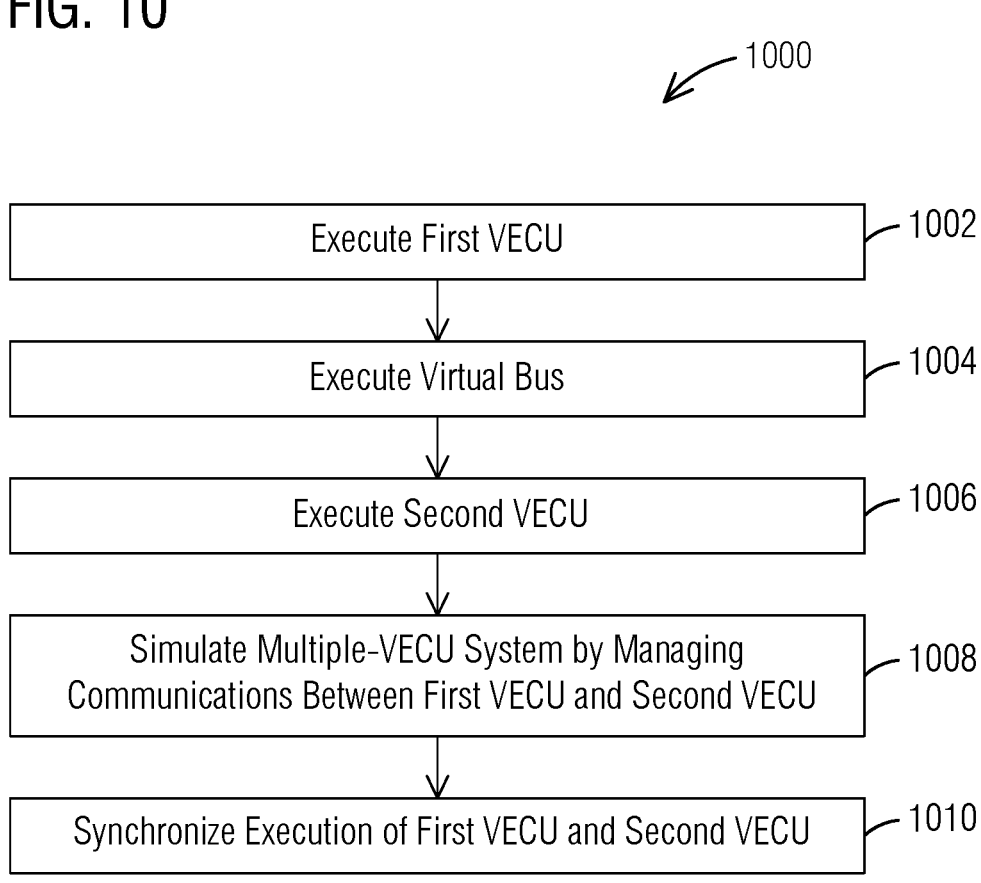
FIG. 10 illustrates a process in accordance with disclosed embodiments.

FIG. 10 illustrates a process 1000 performed by one or more computer systems (generically referred to as the "system" below), such as computer system 101, for simulation and testing of multiple VECUs, in accordance with disclosed embodiments.

The system executes a first virtual electronic control unit (VECU) (1002). The first VECU simulates operation of an electronic control unit (ECU); the simulated ECU can be an automotive ECU.

The system executes a virtual bus, the virtual bus associated with the first VECU (1004).

The system executes at least one second VECU (1006).

The system simulates a multiple-VECU system by managing communications, using the virtual bus, between the first VECU and the at least one second VECU (1008). The multiple-VECU system can represent a portion of an automobile control system. The virtual bus can convert communications in a first protocol from the first VECU using a protocol manager and transmits the communications to the at least one second VECU using an inter-process communication (IPC) channel.

As described above, the communications can be transmitted in a carrier on the IPC channel, the carrier having a pilot field, a first-in-first-out (FIFO) field, and an acknowledgement (ACK) field. The pilot field can include an identifier field, a frame definition field that defines a frame type and size of the FIFO field, and protocol field that identifies a protocol type of the FIFO field, where the protocol type corresponds to the first protocol above.

While simulating the multiple-VECU system, the system synchronizes execution of the first VECU and the at least one second VECU using the virtual bus (1010). In some cases, the first VECU is designated a master VECU and synchronizing execution includes sending a synchronization message from the first VECU to the second VECU, causing the second VECU to advance execution by a predetermined execution time. In some cases, the first VECU does not advance execution until an acknowledgement message is received from the second VECU.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form. Various process steps can be omitted, repeated, performed sequentially or concurrently with other steps or processes, or combined with other steps or processes. The features or steps disclosed herein can be combined or exchanged with others within the scope of the disclosure.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle. The use of terms such as (but not limited to) "mechanism," "module," "device," "unit," "component," "element," "member," "apparatus," "machine," "system," "processor," or "controller," within a claim is understood and intended to refer to structures known to those skilled in the relevant art, as further modified or enhanced by the features of the claims themselves, and is not intended to invoke 35 U.S.C. § 112(f).

What is claimed is:

1. A method comprising:

executing, by one or more computer systems, a first virtual electronic control unit (VECU) and at least one second VECU;

executing, by the one or more computer systems, a virtual bus associated with the first VECU and the at least one second VECU, wherein the virtual bus includes a data exchange channel and a synchronization channel configured to enable communication between the first VECU and the at least one second VECU;

simulating, by the one or more computer systems, a multiple-VECU system by managing communications, using the virtual bus, between the first VECU and the at least one second VECU;

synchronizing, by the one or more computer systems, execution of the first VECU and the at least one second VECU using the virtual bus by sending a synchronization message from the first VECU over the synchronization channel of the virtual bus to the at least one second VECU, causing the at least one second VECU to advance execution by a predetermined virtual simulation time, wherein, in response to receiving the synchronization message over the synchronization channel of the virtual bus, the at least one second VECU transmits an acknowledgement message over the synchronization channel of the virtual bus to the first VECU, wherein the acknowledgement message confirms the at least one second VECU received the synchronization message from the first VECU, and wherein the first VECU advances execution to synchronize with the at least one second VECU in response to receiving the acknowledgement message from the at least one second VECU; and after the first VECU has been synchronized with the at least one second VECU in response to the synchronization message and the acknowledgment message, transmitting, by the one or more computing systems, messages from the first VECU and the at least one second VECU over the data exchange channel of the virtual bus, wherein the virtual bus is configured to simulate collisions between the transmitted messages and arbitrate between the messages having collided.

2. The method of claim 1, wherein the first VECU and the at least one second VECU together represent a portion of an automobile control system.

3. The method of claim 1, wherein the virtual bus converts communications in a first protocol from the first VECU using a protocol manager and transmits the communications to the at least one second VECU using an inter-process communication (IPC) channel.

4. The method of claim 3, wherein the communications are transmitted in a carrier on the IPC channel, the carrier having a pilot field, a first-in-first-out (FIFO) field, and an acknowledgement (ACK) field.

5. The method of claim 4, wherein the pilot field includes an identifier field, a frame definition field that defines a frame type and size of the FIFO field, and protocol field that identifies a protocol type of the FIFO field, and wherein the protocol type corresponds to the first protocol.

6. The method of claim 1, further comprising arbitrating, by the virtual bus, between a message sent by the first VECU and a message sent by a third VECU.

7. One or more computer systems, each comprising:

a processor; and an accessible memory, the one or more computer systems together configured to:

execute a first virtual electronic control unit (VECU) and at least one second VECU;

execute a virtual bus, the virtual bus associated with the first VECU and the at least one second VECU, wherein the virtual bus includes a data exchange channel and a synchronization channel configured to enable communication between the first VECU and the at least one second VECU;

simulate a multiple-VECU system by managing communications, using the virtual bus, between the first VECU and the at least one second VECU;

synchronize execution of the first VECU and the at least one second VECU using the virtual bus by sending a synchronization message from the first VECU over the synchronization channel of the virtual bus to the at least one second VECU, causing the at least one second VECU to advance execution by a predetermined virtual simulation time, wherein, in response to receiving the synchronization message over the synchronization channel of the virtual bus, the at least one second VECU transmits an acknowledgement message over the synchronization channel of the virtual bus to the first VECU, wherein the acknowledgement message confirms the at least one second VECU received the synchronization message from the first VECU, and wherein the first VECU advances execution to synchronize with the at least one second VECU in response to receiving the acknowledgement message from the at least one second VECU; and after the first VECU has been synchronized with the at least one second VECU in response to the synchronization message and the acknowledgment message, transmit messages from the first VECU and the at least one second VECU over the data exchange channel of the virtual bus, wherein the virtual bus is configured to simulate collisions between the transmitted messages and arbitrate between the messages having collided.

8. The one or more computer systems of claim 7, wherein the first VECU and the at least one second VECU together represent a portion of an automobile control system.

9. The one or more computer systems of claim 7, wherein the virtual bus converts communications in a first protocol from the first VECU using a protocol manager and transmits the communications to the at least one second VECU using an inter-process communication (IPC) channel.

10. The one or more computer systems of claim 9, wherein the communications are transmitted in a carrier on the IPC channel, the carrier having a pilot field, a first-in-first-out (FIFO) field, and an acknowledgement (ACK) field.

11. The one or more computer systems of claim 7, wherein the pilot field includes an identifier field, a frame definition field that defines a frame type and size of the FIFO field, and protocol field that identifies a protocol type of the FIFO field, and wherein the protocol type corresponds to the first protocol.

12. An apparatus comprising a non-transitory computer-readable medium storing executable instructions that, when executed, cause one or more computer systems to:

execute a first virtual electronic control unit (VECU) and at least one second VECU;

execute a virtual bus, the virtual bus associated with the first VECU and the at least one second VECU, wherein the virtual bus includes a data exchange channel and a synchronization channel configured to enable communication between the first VECU and the at least one second VECU;

simulate a multiple-VECU system by managing communications, using the virtual bus, between the first VECU and the at least one second VECU;

synchronize execution of the first VECU and the at least one second VECU using the virtual bus by sending a synchronization message from the first VECU over the synchronization channel of the virtual bus to the at least one second VECU, causing the at least one second VECU to advance execution by a predetermined virtual simulation time, wherein, in response to receiving the synchronization message over the synchronization channel of the virtual bus, the at least one second VECU transmits an acknowledgement message over the synchronization channel of the virtual bus to the first VECU, wherein the acknowledgement message confirms the at least one second VECU received the synchronization message from the first VECU, and wherein the first VECU advances execution to synchronize with the at least one second VECU in response to receiving the acknowledgement message from the at least one second VECU; and after the first VECU has been synchronized with the at least one second VECU in response to the synchronization message and the acknowledgment message, transmit messages from the first VECU and the at least one second VECU over the data exchange channel of the virtual bus, wherein the virtual bus is configured to simulate collisions between the transmitted messages and arbitrate between the messages having collided.

13. The apparatus of claim 12, wherein the first VECU and the at least one second VECU together represent a portion of an automobile control system.

\* \* \* \* \*